United States Patent

[11] 3,617,812

| [72] | Inventor | Burkhard Deter<br>Munich, Germany |
|---|---|---|
| [21] | Appl. No. | 880,138 |
| [22] | Filed | Nov. 26, 1969 |
| [45] | Patented | Nov. 2, 1971 |
| [73] | Assignee | Messerschmitt-Bolkow-Blohm<br>Munich, Germany |
| [32] | Priority | Nov. 28, 1968 |
| [33] | | Germany |
| [31] | | P 18 11 422.2 |

[54] PROTECTIVE DEVICE FOR POWER SUPPLY SYSTEMS
7 Claims, 1 Drawing Fig.

[52] U.S. Cl. .................................................. 317/27
[51] Int. Cl. .................................................. H02h 3/28
[50] Field of Search ........................................... 317/27

[56] References Cited
UNITED STATES PATENTS

| 3,148,309 | 9/1964 | Neher ........................ | 317/27 |
| 3,223,891 | 12/1965 | McClymont ................. | 317/27 |
| 3,296,495 | 1/1967 | Paddison ..................... | 317/27 |
| 3,340,435 | 9/1967 | Hoel ........................... | 317/27 X |
| 3,512,045 | 5/1970 | Tipton et al. ............... | 317/27 X |

Primary Examiner—James D. Trammell
Attorney—John J. Byrne

ABSTRACT: A differential protective device for providing short circuit protection for electrical networks such as airborne power supply systems includes a series of current transformers for monitoring the input and output leads of a network and a summing circuit for summing the output signals from the current transformers. Where a fault exists in the network a nonzero current summation will result and a corresponding output voltage produced by the summing circuit. The output voltage is applied to a comparator circuit which is connected to a control unit for controlling a programmed switching operation within the network to locate the fault.

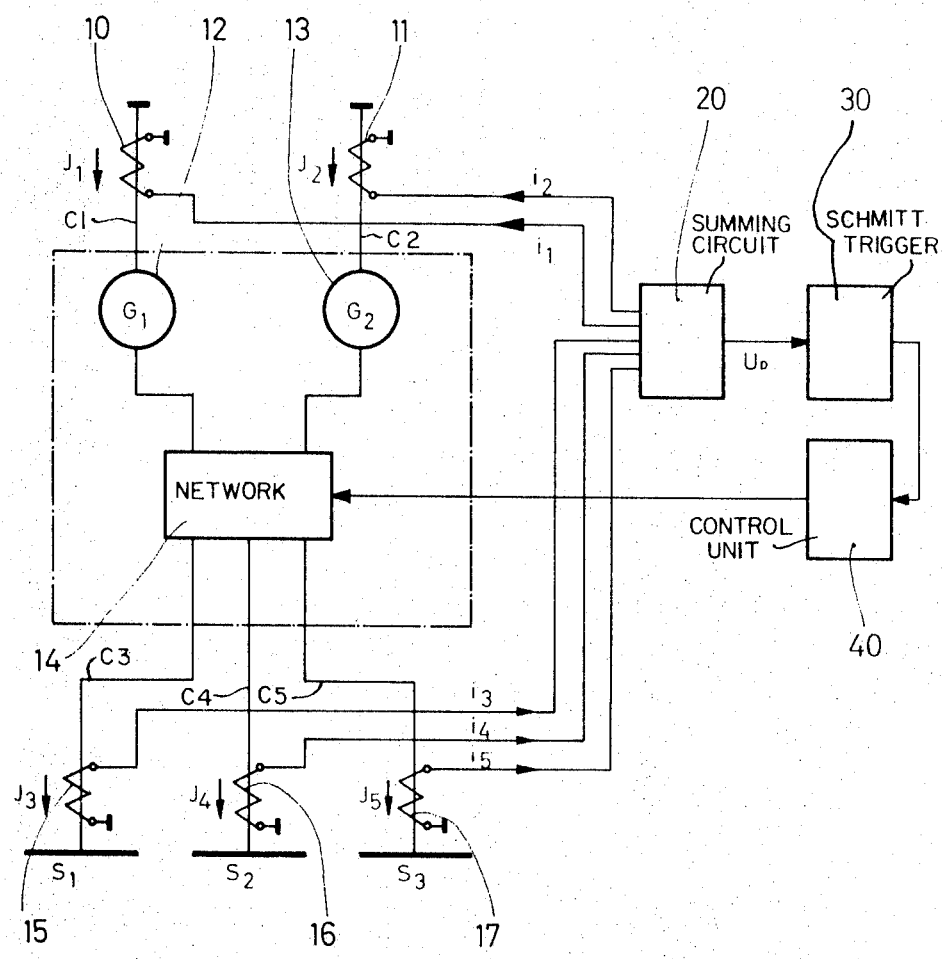

3,617,812

PROTECTIVE DEVICE FOR POWER SUPPLY SYSTEMS

FIELD OF THE INVENTION

The present invention relates to protective devices and, more particularly, to differential protective devices for providing fault protection for electrical networks such as airborne power supply systems.

BACKGROUND OF THE INVENTION

A number of different approaches have been taken in providing fault or short-circuit protection for electrical systems. For example, in one prior art arrangement the currents flowing into and out of a network are compared and the highest current value determined and used as a trigger. Current summing is not utilized in this approach. In another approach, a differential-type arrangement is provided which includes a relay sensitive to current direction and impedance and to which vectorial combinations of several inputs are applied. However, the input to the relay does not include all of the currents flowing into and out of the test network. In yet a further approach, a leakage protection device is provided which monitors the flow of equalizing currents rather than comparing voltages. Vectorial summation of auxiliary currents is obtained by measuring a third current formed in a common line by the auxiliary currents.

These approaches suffer a number of disadvantages, among which is the requirement of separate current transformer pairs for each line of a network to be monitored. The resultant number of transformer and auxiliary equipment required is prohibitive particularly for aircraft and space vehicle use.

SUMMARY OF THE INVENTION

In accordance with the present invention a protective system is provided which is particularly adapted for airborne use in that the weight of the necessary equipment as well as the complexity of the associated wiring is substantially reduced as compared with known systems. One important feature of the system of the invention is that the number of current transformers necessary is reduced. A further important feature is that the electrical components of the system of the invention readily lend themselves to incorporation in integrated circuits.

In accordance with a presently preferred embodiment of the invention a differential protective system is provided wherein a summing circuit adds up all of the currents flowing into and out of a test network and provides an output voltage corresponding to this sum. When a fault exists in the network, the currents do not sum to zero, and the resultant signal is used to control the network in accordance with a particular preselected program. The output of the summing circuit is preferably connected to a comparator circuit in the form of a Schmitt trigger, the output of which is connected to the input of a control unit. The control unit may, for example, control opening of a series of switches in the test network in a particular sequence to provide an indication of the location of the fault within the network.

Other features and advantages of the invention will be set forth in or are apparent from the detailed description of a preferred embodiment thereof found hereinbelow.

BRIEF DESCRIPTION OF THE DRAWING

The single FIGURE in the drawing is a schematic block diagram of a presently preferred embodiment of the invention.

DESCRIPTION OF A PREFERRED EMBODIMENT

Referring to the drawing, an electrical network, which may, for example, be an airborne power supply system, is generally denoted 14. First and second generators 12 and 13 are connected in the input circuit of network 14 through conductors C1 and C2. The currents, denoted $J_1$ and $J_2$, respectively, flowing in input conductors C1 and C2 are monitored by current transformers 10 and 11. Network 14 is connected through output conductors C3, C4 and C5 to bus bars $S_1$, $S_2$ and $S_3$, respectively, and the currents in these conductors, denoted $J_3$, $J_4$ and $J_5$, respectively, are monitored by current transformers 15, 16 and 17, respectively. It will of course be appreciated that the embodiment shown is merely exemplary and that the number of input and output conductors and the arrangement of these conductors is a matter of design.

In accordance with the present invention the input transformer currents $i_1$ and $i_2$ and the output transformer currents $i_3$, $i_4$ and $i_5$ are summed in a summing circuit 20 to provide a control output.

In accordance with Kirchoff's Law $$\Sigma i = 0, \quad (1)$$

and thus the equation for the currents flowing in current transformers 12 to 17 under normal conditions is $$i_1 + i_2 = i_3 + i_4 + i_5 \quad (2)$$

Thus, under conditions where $$\Sigma i \neq 0 \quad (3)$$

and thus $$i_1 + i_2 \neq i_3 + i_4 + i_5 \quad (4)$$

a resultant current will be produced. Summing device provides an output voltage corresponding to the algebraic sum of the input currents thereto and thus produces no output where this sum is equal to zero, that is, where 93 $i=0$. However, where $\Sigma i \neq 0$ an output signal will be provided at the output of summing circuit 20 which is a function of the differential current $i_D$, where $$i_D = i_1 + i_2 - (i_3 + i_4 + i_5).$$

The output of summing circuit 20 is connected to the input of comparator circuit 30 preferably in the form of a conventional Schmitt trigger. Schmitt trigger 30, in turn, controls activation of a control unit 40. When the output voltage produced by summing circuit 20 exceeds a predetermined value the Schmitt trigger 30 will apply a control signal to the input control unit 40. In general control unit 40 is utilized in "splitting" network 14 so that subsections thereof each are provided with separate differential protection. Control unit 40, which may take a number of forms, preferably controls the operation of a series of switches (not shown) within network 14 in a programmed manner. For example, unit 40 may control the sequential opening of a series of switches in network 14 so that when a switch is opened which disconnects a portion of the circuit wherein a trouble spot such as a short circuit exist such that the sum of the input currents to summing circuit 20 is again zero, an indication is provided as to which portion of network 14 is involved. Such an indication can, for example be provided by arranging for series of lights to be actuated responsive to the opening of the switches in network 14 so that the last light which is lit during the sequential operation of the switches provides an indication as to which section of network 14 is faulty. It will be appreciated that other switching sequences can be utilized and that various combinations of switches can be automatically opened and closed in accordance with a particular program in attempting to pinpoint the fault. The complexity of the switching program is, of course, a matter of design choice and will be a function of the complexity of network 14 among other factors.

Although the invention has been described relative to a preferred illustrative embodiment thereof, it will be understood that variations and modifications may be effected in this embodiment without departing from the scope and spirit of the invention.

I claim:

1. A differential protective system for an electrical network comprising a first plurality of current transformers, for monitoring the current flowing in each of the input conductors of the network, each current transformer of said first plurality of current transformers individually monitoring an input conductor to the network and producing an output current in accordance with the current flowing in that input conductor, and further plurality of current transformers for monitoring the current flowing in each of the output conductors of the network, each current transformer of said second plurality of current transformer individually monitoring an output conductor from the network and producing an output current in accordance with the current flowing in that output conductor, summing means for algebraically summing the output currents from said current transformers and for producing an output signal in accordance with that resultant algebraic sum, and control means responsive to said output signal for controlling said network in accordance with a predetermined program.

2. A system as claimed in claim 1 wherein said summing means comprises summing circuit for producing a voltage signal in accordance with the sum of the output currents of said current transformers.

3. A system as claimed in claim 2 further comprising a comparator circuit connected to the output of said summing circuit and to the input of said control means.

4. A system as claimed in claim 3 wherein said comparator circuit comprises a Schmitt trigger.

5. A system as claimed in claim 4 where said control means comprises means for providing selective switching within the network in accordance with a predetermined program.

6. A system as claimed in clam 1 wherein said network includes at least one active element.

7. A system as claimed in claim 6 wherein the number of input conductors is different from the number of output conductors.

* * * * *